United States Patent [19]

Zielinski et al.

[11] Patent Number: 5,214,102
[45] Date of Patent: May 25, 1993

[54] FLUORINATION OF ARTICLES MOLDED FROM ELASTOMERS

[75] Inventors: Ronald E. Zielinski; Mark J. Seabury, both of Fort Wayne, Ind.

[73] Assignee: William S. Shamban, Pacific Palisades, Calif.

[21] Appl. No.: 802,555

[22] Filed: Dec. 5, 1991

Related U.S. Application Data

[63] Continuation-in-part of Ser. No. 732,631, Jul. 19, 1991.

[51] Int. Cl.⁵ ............................................... C08F 8/22
[52] U.S. Cl. .................................... 525/192; 524/525; 524/571; 524/575; 524/590; 524/601; 524/606; 525/331.7; 525/332.8; 525/332.9; 525/333.1; 525/356; 525/410; 525/437; 525/448; 525/450; 525/451; 525/453
[58] Field of Search ............... 525/356, 192, 420, 437, 525/448, 450, 451, 453; 524/525, 571, 575, 590, 601, 606

[56] References Cited

U.S. PATENT DOCUMENTS

| | | | |
|---|---|---|---|
| 2,497,046 | 10/1945 | Kropa | 260/92.1 |
| 3,992,221 | 11/1976 | Homsy et al. | 134/16 |
| 4,020,223 | 4/1977 | Dixon | 428/224 |
| 4,076,916 | 2/1978 | Lagow | 526/43 |
| 4,144,374 | 3/1979 | Lagow et al. | 428/334 |
| 4,404,256 | 9/1983 | Anand et al. | 525/356 |
| 4,593,050 | 6/1986 | Cohen et al. | 515/356 |
| 4,621,107 | 11/1986 | Lagow et al. | 522/131 |
| 4,900,793 | 2/1990 | Lagow et al. | 525/326.3 |

OTHER PUBLICATIONS

"The Direct Fluorination of Hydrocarbon Polymers" by Otsuka and Lagow, Journal of Fluorine Chemistry (1974) 371–380.

"The Controlled Reaction of Hydrocarbon Polymers with Elemental Fluorine" by Lagow and Margrave, Polymer Letters Ed. vol. 12, pp. 177–184 (1974).

*Primary Examiner*—Bernard Lipman
*Attorney, Agent, or Firm*—Baker & Daniels

[57] ABSTRACT

A method of producing fluorinated elastomeric articles having reduced coefficients of friction, improved wear life and improved resistance to fluid permeability. A thermoplastic elastomeric article is exposed to gaseous fluorine in a reactor vessel under reaction conditions sufficient to create a fluorinated material on the external portions of the elastomeric article, which fluorinated material extends inwardly into the matrix of the article, without promoting degradation of the tensile properties of the article.

26 Claims, 8 Drawing Sheets

FLUORINATION OF ARTICLES MOLDED FROM ELASTOMERS

CROSS REFERENCE TO RELATED APPLICATIONS

This is a continuation-in-part of application Ser. No. 07/732,631, filed Jul. 19, 1991.

BACKGROUND OF THE INVENTION

This invention relates generally to a method for the modification, through exposure to elemental fluorine gas, of articles molded from elastomers in order to improve the performance characteristics of the modified elastomers.

An elastomer is generally a polymeric material which possesses an inherent property known as elasticity which allows the material to return to its original form when released from a deforming load. An elastomer is capable of a substantial degree of stretching under tension before breaking. The above-referenced co-pending application, of which this application is a continuation-in-part, the disclosure of which is incorporated by reference herein, discloses a method for producing a fluorinated elastomeric article having a reduced coefficient of friction and an increased wear life. The present application discloses a method for producing an elastomeric article, and particularly a thermoplastic elastomeric article, having the above-described beneficial properties, as well as improved barrier properties, such as resistance to fluid permeability.

Thermoplastic elastomers (TPEs) have the performance characteristics of a conventional thermoset rubber with the fabrication characteristics of a conventional thermoplastic. TPEs have been categorized according to chemical composition and morphology into six commercially-available generic classes. These classes are further described in, for example, "Handbook of Thermoplastic Elastomers", 2nd Edition, B. M. Walker and C. P. Rader (Editors), Van Nostrand (1988). This reference, and all others referred to herein, are hereby incorporated by reference.

Elastomers are commonly used in a wide range of applications. These applications include, but are not limited to: static and dynamic seals, couplings, rollers, bushings, bearings, diaphragms, gears, belts, hose and tubing, springs, and shock absorbers. The performance of elastomers used in these and other applications is often limited because of the inherent friction characteristics of these materials. Several methods of improving these undesirable properties are currently in use in industry. The most common of these methods is to add to the elastomer formulation a material that is commonly referred to as an "internal lubricant". Many such materials are commercially available, including amide waxes, metallic stearates, molybdenum disulfide, various fluorocarbons, complex esters, fatty acids, polyethylenes, silicon oils, etc. When the elastomer is processed into a finished part, the internal lubricant diffuses to the surface of the article. During operation, a lubricative layer is formed between the elastomer and the mating surface, which lubricative layer lowers friction and, to some extent, increases the wear life of the elastomer. This effect, however, is often short-lived since the internal lubricant gradually wears away. Additionally, this technique introduces foreign material into the elastomer matrix and also has a tendency to induce non-uniform performance, since the lubricant's diffusion rate is controlled by temperature and pressure, both of which can vary considerably over the operational conditions.

Other techniques are also used to reduce friction in elastomeric materials. These include coating finished articles with PTFE, silicone grease or other external lubricants. Occasionally, a low friction coating may be used in tandem with an internal lubricant.

The common factor between all the techniques discussed above is that the benefits that arise from each technique are short term only. The root of the problem, i.e., the inherent high friction in certain elastomeric articles is not addressed.

It is highly desirable, therefore, to generate low friction elastomeric materials which retain their low friction and high wear resistance characteristics for substantial periods of time. It is also desirable to generate low friction thermoplastic elastomeric materials which exhibit improved barrier properties.

SUMMARY OF THE INVENTION

The present invention discloses a procedure by which the chemical structure of the polymeric material itself is modified so that low friction material is generated on the outer portions of the finished article. Since the low friction material is part of the elastomer matrix, it is not prone to the problems of diffusion or rapid wear typically associated with an internal or external lubricant. As a result, and due to the exceedingly low friction coefficients generated in certain materials, it has been possible to considerably extend wear life in these materials, especially when used in dynamic applications. In addition, certain thermoplastic elastomers modified according to the method of the present invention exhibit improved barrier properties, including an increased resistance to swell that may be caused by fluid permeability.

This invention, therefore, comprises a method of reducing the static and dynamic friction coefficients, increasing the wear life and abrasion resistance, and improving the barrier properties of articles molded from elastomers, particularly thermoplastic elastomers. Briefly stated, a preferred embodiment of the inventive method comprises contacting fabricated thermoplastic elastomeric articles with gaseous fluorine under carefully controlled conditions and in the presence of a hydrogen fluoride (HF) scavenger. This process modifies the chemical structure of the TPE so that a fluorinated material is generated on the external portion of the elastomer, which fluorinated material extends inwardly into the elastomer matrix.

The low friction characteristics of certain commercially available perfluorinated thermoplastics such as PTFE are well known. Similarly, the fluorinated materials generated by the methods of this invention endow the modified articles with low wear and low friction characteristics. Since the fluorinated material is part of the elastomeric matrix, it will not diffuse, leach or otherwise be lost from the material except through normal abrasive wear.

DESCRIPTION OF THE PREFERRED EMBODIMENT

For an article to be amenable to fluorine modification according to the present invention, it must be composed, either wholly or partially, of a suitable elastomeric polymer. Such a polymer should preferably possess a backbone chain which is primarily hydrocarbon in nature, i.e. essentially composed of carbon atoms to which are attached a high proportion of hydrogen atoms. The term "backbone" is understood and routinely used by those skilled in the art of polymer chemistry.

When the article is contacted with fluorine gas, a chemical reaction takes place in which the hydrogen atoms attached to the polymer chain are substituted by fluorine atoms, i.e, the polymer becomes "fluorinated". Hydrogen fluoride (HF) is generated as a by-product of this reaction, which reaction may be represented (in non-stoichiometric form) by the following example:

When all replaceable hydrogen atoms are substituted with fluorine atoms, "perfluorination" of the material is said to have occurred. Perfluorination of the article's surface in this manner produces optimum levels of friction reduction in the article.

This "fluorination reaction", which is very rapid and exothermic, takes place only where the elastomer comes in physical contact with gaseous fluorine, i.e. the reaction is essentially diffusion controlled. Articles exposed to fluorine are consequently fluorinated from the outside inwardly so that, initially, fluorination occurs only at those surfaces immediately exposed. Subsequent reaction takes place below the surface. The depth of penetration by fluorine into the article, and hence the depth of the fluorinated layer, will vary with the particular polymeric material to be fluorinated, and is governed by temperature, pressure, fluorine concentration and duration of reaction.

Elastomers suitable for fluorine modification according to the present invention need not necessarily be completely hydrocarbon in nature. The polymer backbone should however, contain enough hydrocarbon character (i.e., sufficient replaceable aliphatic carbon-hydrogen bonds) that the fluorinated matrix generated upon contacting the system with fluorine will possess the desired level of friction reduction. Backbone chains which contain other groups or atoms in addition to carbon, or possess pendant groups attached to the backbone, may also be suitable for fluorine modification in certain situations. However, these atoms or groups should not interfere with the process or react unfavorably with fluorine so as to promote degradation or fragmentation of the polymer backbone. The suitability of a given elastomer to direct fluorination via the processes disclosed in this invention, and the reduction in friction coefficients attainable, may be established through routine experimentation by those skilled in the art.

The preferred method of this invention involves direct fluorination of the polymeric material using fluorine gas. The procedure may be performed in a number of ways, each of which is within the scope of the present invention. The preferred method requires placing a fabricated article, or a plurality of fabricated articles, into a suitable reactor vessel and exposing the article/articles to fluorine gas. This process liberates HF as the article is fluorinated. HF is an undesirable by-product since it may interfere with the fluorination process and/or degrade the bulk material. It is usually removed from the process by adding a suitable "scavenger", such as sodium fluoride (NaF), to the reactor vessel. The scavenger reacts with HF to produce sodium bifluoride (NaF + HF → NaHF$_2$) which is relatively benign to the process.

Preferably, the reactor vessel is purged with an inert gas, such as nitrogen or helium, prior to commencing the fluorination reaction. This will minimize the generation of acid fluoride groups, and their carboxylic acid hydrolysis products, in the modified article by excluding oxygen from the reaction medium. For the same reasons, traces of moisture should also be removed from the reaction medium. The presence of carboxylic acid groups can adversely effect the friction and wettability characteristics of the fluorinated article.

The fluorine gas used in this procedure will preferably be diluted with nitrogen or helium before it enters the reactor vessel. The fluorine content of this "process gas" may range from trace amounts, such as 0.5%, up to 100%, depending upon the elastomer considered and its ultimate application. Since the process is very exothermic, the fluorine content of the mixture must be carefully controlled. Excessive exposure to fluorine, particularly at the start of a reaction, can cause the combustion of the article being fluorinated. For most applications, a process gas mixture containing from about 2 to about 95% fluorine by volume is preferred, with a process gas containing from about 5 to about 75% fluorine by volume most preferred.

The reaction of fluorine with any given elastomer will usually result in a certain degree of chain scission in addition to the desired fluorination reaction. Scission is the rupture of backbone or crosslinking bonds in the elastomer matrix. This process is detrimental to the desired reaction as it usually involves fragmentation of the polymer backbone. Excessive backbone fragmentation ultimately results in degradation of the tensile properties of the elastomer which may adversely effect the performance of the fluorinated article.

For a given elastomer, scission will tend to increase with exposure time at a given fluorine concentration, or with increasing fluorine concentration. Consequently, when an elastomer is modified by the methods of this invention, the fluorination conditions must be optimized so that a maximum reduction in friction coefficient may be obtained with a minimum of polymer degradation. This may be particularly significant when modifying an elastomeric component which is to conform to the physical requirements of a particular specification.

The precise fluorination conditions used to modify a given article will depend on the type of elastomer from which the article is fabricated. For any given elastomer, these conditions will vary according to the desired application of the modified elastomer, and may be established through routine experimentation using the method disclosed in this invention.

The method of the present invention does not provide for the perfluorination of the entire body of the article. Perfluorination would effectively create a new material having potentially very different physical properties from the original. The purpose of the present invention is to create articles having low coefficients of friction through modification of the surface and generally immediate subsurface of the articles, while maintaining the remaining original physical properties of the articles. Since the original tensile properties are not appreciably altered, the invention permits the direct replacement of articles (including those requiring qualification of the elastomer to a particular specification) used in existing applications with polymer modified articles of the same material and configuration, yet having improved wear life, reduced static and dynamic coefficients of friction, and improved barrier properties.

The fluorination of articles by the method of the present invention negates the need to create thermoplastic elastomeric articles specially formulated to achieve the improved performance characteristics noted above. Elastomers are often formulated—that is, compounded with various types of fillers and other processing materials—so that a range of potential physical properties may be accommodated by that elastomer as required. The process for the friction reduction of elastomeric articles described by the present invention is generally polymer-dependent. That is, a given elastomer could be formulated in a number of ways, but as long as that elastomer is compatible with the process, its various possible formulations should be amenable to the fluorination procedure. For example, it has been established that copolyester thermoplastic elastomers can have their friction coefficients significantly reduced by the methods of this invention. This is true, regardless of the formulation, the hard block/soft block ratio of the elastomer, or its manufacturer. Similarly, copolyester thermoplastic elastomers modified according to the present invention exhibit a significant resistance to fluid permeability.

A variety of fluorine reaction vessel designs are suitable for carrying out the invention, which vessel designs are well known to those skilled in the art. Preferred examples include magnetically- or mechanically-stirred bomb type vessels and rotating drum reactors. Suitable materials for reactor vessel construction include monel, inconel, hastelloy, brass, stainless steel or any other metal not subject to corrosion by fluorine under the operating conditions employed in the inventive process.

The fluorination reaction must be performed under carefully controlled conditions so that fluorination of the article is achieved without significant loss of its tensile properties. Specifically, the temperature, pressure, fluorine concentration and duration of reaction must all be carefully monitored. Preferably, flow rates of fluorine and nitrogen gases used in the process are controlled and measured by mass flow controllers. Use of these devices allows one to accurately manipulate the fluorine concentration in the process gas mixture, and control its rate of delivery to the reactor vessel. Technical grade (97% or better) fluorine and Ultra Pure Carrier grade (or better) nitrogen having a dew point not greater than $-100°$ F. are the preferred reagents for this process. However, other grades of fluorine or nitrogen may also be used. For example, fluorine pre-diluted with nitrogen may be used in place of technical grade fluorine. Obviously, the use of fluorine gas mixtures in this way limits the maximum fluorine concentration in the reactor, and such mixtures may not be desirable in circumstances where high fluorine levels are desired.

Preferably, the article/articles to be fluorinated are placed in the reactor vessel together with a hydrogen fluoride scavenger. Finely divided sodium fluoride is the preferred scavenger, although other scavengers such as potassium fluoride may also be used with favorable results. The quantity of sodium fluoride used should be sufficient to react with all the HF formed in the reaction. As an approximate guideline, one gram of sodium fluoride may be added for every gram weight of material to be fluorinated. However, the stoichiometric quantity of sodium fluoride required will likely be significantly less than this. It is preferred that the articles are in close physical contact with the scavenger during the fluorination process in order to optimize the scavenging process. This may be done, for example, by stirring the articles in a bed of powdered sodium fluoride. For larger articles it may be necessary to tumble the articles with the scavenger in a rotating drum-type vessel. Acceptable results may also be obtained without agitation of the articles. In certain circumstances, for example where a slight deterioration of original tensile properties is acceptable, the reaction may be performed without the presence of an HF scavenger in the reactor.

Once the reactor vessel is loaded, it is continuously purged with UPC grade nitrogen (or other inert gas) for a sufficient time so that oxygen and water vapor are flushed from the chamber. Fluorine is then added to the nitrogen flow so that a mixture of fluorine in nitrogen passes directly into the reactor vessel, where it contacts the articles to be fluorinated.

Typical fluorination reaction parameters (i.e., fluorine and nitrogen flow rates, duration of reaction, etc.) will vary somewhat between samples. Specific reaction parameters chosen for the fluorination reaction will depend on a number of factors, including desired reduction in friction coefficient, type of material, size of reactor vessel, and surface area and weight of articles to be fluorinated. Articles of virtually any size and configuration may be fluorinated by the methods disclosed in this invention, limited only by the capacity of the reactor vessel. Additionally, the only limitation to the number of articles which may be fluorinated in one batch is the capacity of the reactor vessel.

The following experimental procedure is representative of the process used to generate fluorinated articles by the methods of the present invention. This procedure may be adapted by those skilled in the art to incorporate the use of alternative reactor vessels, elastomers, batch sizes, configurations, fluorination conditions, etc.

To a brass, bomb-type reactor vessel, internal volume 0.75 liters, was charged anhydrous sodium fluoride powder (30.0 g.) and a teflon coated magnetic stir bar (2" length). Fifteen microtensile dumbbells of the TPE Hytrel, 4056 (total weight 17.008 g.) were loaded into the reactor. The dumbbells were stirred in the sodium fluoride at approximately 30 rpm. After sealing the vessel and purging for 30 minutes with UPC grade nitrogen at 150 scc/min., the fluorine flow rate was set at 25 scc/min. and the nitrogen flowrate set at 35 scc/min. These flowrates were maintained for four hours at room temperature, after which time the fluorine flow was stopped. The reactor was then repurged with UPC nitrogen for 30 minutes at 150 scc/min. The fluorinated TPE dumbbells were then removed from the reactor vessel, gently washed in warm water, and dried at 70° C. for 5 minutes. The product weighed 17.148 g.

Articles produced by the method of the present invention are particularly useful in applications where the performance of an article has been limited by its high friction and wear characteristics, and where the article has exhibited an undesirable amount of swell. For example, articles produced by the method of the present invention are particularly useful for improving the performance of static and dynamic thermoplastic elastomeric seals. Those skilled in the art will additionally recognize that there are numerous other potential applications of this invention. If these other beneficial applications follow the teachings of the present invention, such applications are within the scope of this invention.

Articles suitable for modification by the methods of this invention should therefore comprise an elastomeric formulation that is compatible with the fluorination process. Thermoplastic elastomers may be formulated with fillers and other additives known to those skilled in the art of thermoplastic processing, so that the resulting elastomer has physical characteristics required for service in a specific application. Generally speaking, base polymer and fillers typically account for at least 95% by weight of most thermoplastic elastomeric formulations.

The preferred fillers commonly utilized with TPEs are carbon blacks, graphite, carbon powders and fibers, PTFEs and other fluorocarbons, and molybdenum disulfide. All of these fillers are quite benign to the fluorination process. Many other fillers commonly used in the art of TPE processing, such as silicones, calcium carbonate, glass powder, talcs and clays (etc.), may also be used in specific applications. However, since these latter fillers are susceptible in varying degrees to attack by fluorine, they are not generally as widely used as the preferred fillers listed above.

A large number of elastomers suitable for use in many applications are commercially available and may be formulated into an almost unlimited number of compounds. Generally speaking, base polymers suitable for use according to the present invention should be composed of a polymer or polymers possessing a backbone chain which is sufficiently hydrocarbon in nature that the fluorinated matrix generated upon contacting the system with fluorine possesses the improved performance characteristics associated with the teachings of the present invention. Additionally, suitable polymers should not contain a high proportion of atoms or groups, either attached to or part of the backbone chain, which would react unfavorably when contacted with fluorine so as to promote degradation or excessive fragmentation of the polymer backbone.

TPEs have been categorized according to morphology and chemical composition; see, for example, "Modern Plastics Encyclopedia", 1990 Issue, Volume 67, Number 11, McGraw-Hill. It is generally considered that, at the present time, six generic classes of TPE exist commercially. These classes are listed below, with a brief description of typical chemical compositions for each class:

1) Copolyester TPEs
Composed of a random hard block/soft block segmented structure, produced by the condensation of a dialkylterphthalate with tetramethylene and polytetramethylene glycols. The properties of the resulting elastomer vary with the ratio of hard to soft segments in the elastomers.

2) Olefinic TPEs/Thermoplastic Polyolefins (TPOs)
Olefinic TPEs are usually blends or mechanical mixtures of a semicrystalline plastic and an amorphous rubber. The most common TPEs are composed of polypropylene as the hard (plastic) phase with ethylene-propylene (EP) or ethylene-propylene-diene monomer rubber (EPDM) as the soft phase. Other olefinic TPEs incorporate polyethylene and ethylenevinyl acetate copolymers in the plastic phase.

3) Styrenic TPEs
Styrenic TPEs are block copolymers characterized by the presence of hard and soft phases within the individual polymer molecules. Four monomers: styrene, ethylene, butadiene and isoprene are most commonly used in this type of system. Styrenic block copolymers produced commercially include poly (styrene-b-butadiene-b-styrene), or "S-B-S", poly (styrene-b-isoprene-b-styrene), or "S-I-S", and poly (styrene-b-ethylene-butadiene-b-styrene), or "S-EBS". Branched styrene-butadiene copolymers are also produced commercially.

4) Elastomeric Alloy TPEs
This category of TPE has been further subdivided as follows:
a) Thermoplastic Vulcanizates (TPVs)
TPVs are elastomeric alloys composed of an intimate rubber/plastic mixture in which the rubber phase is highly crosslinked. The rubber phase is typically either a ethylene-propylene (EP) or acrylonitrile-butadiene (NBR) rubber which is dispersed in a plastic polypropylene matrix.
b) Melt-Processible Rubbers (MPRs)
MPRs are elastomeric alloys which behave as single-phase systems. They are typically composed of proprietary ethylene inter-polymers and chlorinated polyolefins, in which the ethylene polymer is partially crosslinked in situ.

5) Polyurethane TPEs (TPUs)
Composed of a segmented hard block/soft block structure and usually prepared by the condensation of a diisocyanate with a short chain diol and a polyester or polyether polyol. Commercially, a wide range of diisocyanates are used, with 4,4'-diphenylmethanediisocyanate being the most common. Commonly used short chain diols include ethylene glycol and 1,6-hexane diol.

6) Polyamide TPEs (Nylons)
Nylons are composed of a segmented hard block/soft block structure in which the segments are joined by amide linkages. The properties exhibited by this type of system depend on the chemical composition of the hard (polyamide) and soft (polyether, polyester or polyether-ester) blocks.

Commercially available TPEs taken from each of the above generic classes have been found to exhibit improved performance characteristics when modified by the methods of the present invention. The specific examples presented are intended only to illustrate features of the present invention, and are not intended to represent a complete listing of suitable elastomers. Those skilled in the art will recognize that there are numerous other elastomers which are amenable to the present invention.

New TPEs not within the six generic classes described above may theoretically be created by blending together compatible elastomers taken from different generic TPE classes. For example, certain copolyester TPEs may be blended with certain polyurethane TPEs to form a new TPE material. Those skilled in the art will recognize that this and other TPE blends would be amenable to polymer modification by the methods of the present invention, and the modification of such materials is within the scope of the present invention.

The suitability of a given elastomer to direct fluorination may be established through routine experimentation. If this process follows the teachings of the present invention, it is within the scope of this invention.

REACTION PARAMETERS

All reaction parameters presented in the following Examples and Tables were established through routine experimentation using a magnetically-stirred brass reactor vessel having an internal volume of 0.75 liters. These parameters may be adjusted through routine experimentation to allow the use of alternative reactor designs and increased capacities.

Table 1 presents ranges of parameters that have typically been used to generate fluorinated articles having improved friction and wear properties pursuant to the method of the present invention. The parameters were used for numerous articles composed of a variety of different thermoplastic elastomers and TPE formulations. Batch sizes ranged between 1–500 pieces and weighed between 0.1–100 grams. For a given article, the same reaction parameters would typically be used regardless of batch size. The specific parameters were established through experimentation using the following criteria:

1) Significant reduction in articles' static and dynamic friction coefficients.
2) Minimal depreciation in articles' original physical properties.
3) Significant improvement in articles' permeability resistance.
4) Minimal duration of reaction.

TABLE 1

Typical Fluorination Reaction Parameters[1]

| FUNCTION | FLUORINE FLOW RATE (SCCM) | NITROGEN FLOW RATE (SCCM) | TIME (MINS) | FLUORINE PRESSURE (PSIA) |
|---|---|---|---|---|
| Purge Reactor | 0 | 100–200 | 1–60 | 0 |
| Fluorinate Articles | 5–50 | 15–50 | 60–4800 | 15–50 |
| Purge Reactor | 0 | 100–200 | 30–60 | 0 |

[1]All reactions performed at ambient temperature.

Those skilled in the art will recognize that the process is sufficiently flexible that, for any given elastomeric article, the parameters may be adjusted to accommodate any desired level of fluorination and friction reduction. Although such elastomers may have certain characteristics that are inferior to the optimal properties that are achievable by this invention, they may be useful for specific applications.

The processes described in this invention were typically performed at room temperature. In specific applications, the fluorination reaction can be performed at temperatures ranging from about −100° C. to about 200° C.

Fluorinated articles generated according to the methods of this invention were analyzed by several techniques. Test results are presented in Table 3 through 10, respectively. These techniques are summarized as follows:

1) Friction Coefficient Testing

Static and dynamic coefficients of friction were measured according to ASTM D 1894 using a Testing Machines, Inc. Monitor/Slip and Friction test fixture, which conforms to the ASTM specification. This text fixture determines friction coefficients by pulling a metal sled (to which the sample is mounted) of fixed weight (200 grams) across a polished glass plane. In all cases, samples were pulled a distance of no less than 3" at a constant speed of 5"/min.

2) Taber Abrasion

Taber Abrasion data was determined on a Teledyne Taber Model 5150 Abraser, which conforms to ASTM D 3389. In all cases, test samples were discs of material, approximately 4½" in diameter, cut from either a standard 6"×6" or 6"×9" tensile sheet.

Test samples were evaluated by one of the two following techniques.

a) "Weight Loss" Method

The test sample was subjected to 1000 cycles of abrasive wear using H-18 wheels at a loading of 1000 g. The weight loss resulting from this procedure was recorded.

b) "Wear Factor" Method

A modification to ASTM D3389, developed by Akron Development Laboratory, Inc. (Akron, Ohio) was used to determine the number of abrasive cycles required to wear through the outer "skin" (formed on some elastomers as a consequence of the molding process) of fluorinated and non-fluorinated samples. The greater the number of abrasion cycles required, the greater the abrasion resistance of the material. For a given elastomer, "wear factor" is defined as follows:

$$\text{Wear Factor} = \frac{\text{cycles to wear-through for non-fluorinated elastomer}}{\text{cycles to wear-through for fluorinated elastomer}}$$

A wear factor of less than one indicates that fluorination of the sample has increased its abrasion resistance.

3) Tensile Testing

The mechanical behavior of an elastomer—that is, its deformation and flow characteristics under stress, can be characterized by its stress/strain properties. Important quantities which define the mechanical behavior of an elastomer are as follows:

a) 100% Modulus
b) Tensile Strength
c) 100% Elongation

These properties are collectively referred to as the "tensile properties" of an elastomer.

The modulus, tensile strength and elongation of all samples were determined according to ASTM D412 or ASTM D1708 using an Instron Model 4204 Tensile Tester. Additionally, stress/strain curves were plotted to determine any significant differences in the mechanical behavior of fluorinated and non-fluorinated materials. Samples were cut from standard sized tensile sheets using either an ASTM Die "C" or an ASTM "Microtensile" dogbone die.

4) Infrared Analysis

Infrared analysis of samples was performed according to ASTM D 2702 using a Nicolet Model 5 PC Fourier Transform Infrared (FTIR) Spectrometer.

Since the different functional groups present in any particular material absorb infrared radiation at certain characteristic frequencies, a plot of radiation intensity versus frequency (i.e. the infrared spectrum) will identify the chemical groups present in that material. Of particular interest are the absorption frequencies of carbon-hydrogen and carbon-fluorine bonds. Carbon-hydrogen bonds strongly absorb IR radiation at relatively short wavelengths, typically around 3,000 cm$^{-1}$, whereas carbon-fluorine bonds have a characteristic absorption at a much longer wavelength, typically around 1100 cm$^{-1}$.

FTIR spectra were obtained by using the Attenuated Total Reflectance (ATR) technique which is described in, for example, Mirabella, F.M. and Harrick, N.J. "Internal Reflection Spectroscopy: Review and Supplement" (1985). This is a surface-analytical technique ideally suited to the IR analysis of opaque materials.

The fluorination of a sample is indicated by the appearance of characteristic absorptions in the 1100 cm$^{-1}$ region of its ATR spectrum. If these absorptions appear with a concomitant loss of peaks characteristic of carbon-hydrogen bonds, the replacement of hydrogen by fluorine is indicated.

5) Fluid Permeability Resistance

The ability of certain TPEs to withstand swelling when immersed in certain test fluids was determined according to ASTM D471.

EXPERIMENTAL PROCEDURES

1 Sample Preparation

A number of commercially available elastomers were tested utilizing the procedures of the present invention. Initial physical testing of the samples was performed with the objective of establishing the original physical properties of those samples. This testing was performed in accordance with the appropriate ASTM specification. All articles required for these tests were therefore prepared as required by each ASTM specification.

The test materials were usually obtained directly from the manufacturer in the form of injection-molded "plaques" having dimensions from 3"×4½" to 6"×9". Alternatively, test materials were molded by the inventors from commercially available resins using a Negri-Bossi NB90 injection press. Test articles for friction coefficient, Taber Abrasion, and tensile analysis were prepared by cutting the required configuration from the injection molded plaques by using a metal die. Sample configurations used were as follows:

Coefficient of Friction (ASTM D1894)—2½"×2½"
Taber Abrasion (ASTM D3389)—Disc, approximately 4½" diameter
Tensile Testing (ASTM D412)—"Microtensile" or Die "C" dumbbell The "thickness" dimension of each article was typically 0.07"–0.13" and depended on the thickness of the tensile sheet from which it was prepared.

2. Elastomers Used as Starting Materials

Certain commercially available TPEs were used as starting materials. The TPEs were generally supplied by the manufacturer as injection molded "plaques", or slabs, of material. Test samples were cut directly from the molded slabs. Occasionally, the TPE was supplied as a powder or pellet, in which case tensile slabs of the material were prepared by injection molding using the manufacturer's recommended molding procedure.

Complete formulations of the commercially available TPEs were not available to the inventors in all cases. However, knowledge of the type or class of base polymer contained in each sample allowed the appropriate fluorination conditions to be developed in each case. The TPEs were used as supplied; that is, other than the fluorination procedure disclosed in this invention, there were no additions to or manipulations of any of the elastomeric formulations evaluated by the inventors.

For the purposes of the present invention, the particular elastomers used as starting materials have been designated by the tradename used by the respective suppliers. The particular classification of the TPE is also provided. Acceptable alternate sources of each TPE are generally available under different tradenames from alternate suppliers. Physical testing has been performed on samples taken from each of the generic classifications of the TPEs listed previously. This testing was carried out both prior to and after exposing said articles to fluorine.

The starting materials are listed in Table 2 together with the general classification and the supplier. The original physical properties of the starting materials are presented in Table 3. All date was determined according to the ASTM procedures discussed above.

TABLE 2

TPEs Used as Starting Materials

| Material Tradename | Grades | Supplier | TPE Class/Type |
|---|---|---|---|
| Kraton ® | G7722, G7720 | Shell Chemical Company Houston, TX | Styrenic (S-EB-S) |
| TPR ® | 9101-75W900 | Advanced Elastomer Systems*, St. Louis, MO | TPO |
| Santoprene ® | 101-73 | Advanced Elastomer Systems*, St. Louis, MO | TPV (EPDM/ Polypropylene) |
| Geolast ® | 701-70 | Advanced Elastomer Systems*, St. Louis, MO | TPV (NBR/ Polypropylene) |
| Alcryn ® | 2070 BK | E. I. DuPont Company, Wilmington, DE | MPR |
| Hytrel ® | 4056, 5556, 6359, 7246, 8238 | E. I. DuPont Company, Wilmington, DE | Copolyester |
| Pellethane ® | 2102-90A | Dow Chemical Company, Midland, MI | Polyurethane |
| Zytel ® | FN714 | E. I. DuPont Company, Wilmington, DE | Polyamide (Nylon 11 blend) |
| Grilamid ® | L20GT | EMS-American Grilon, Inc., Sumter, SC | Polyamide (Nylon 12) |
| Stanyl ® | TW300 | DSM Engineering Plastics Reading, PA | Polyamide (Nylon 4/6) |

TABLE 3

Physical Characteristics of Starting Materials

| Elastomer | Tensile Strength (psi) | Elongation (%) | 100% Modulus (psi) | Hardness[1] (Shore) | Friction Coefficient Static | Friction Coefficient Dynamic |
|---|---|---|---|---|---|---|
| Kraton ® G7722 | 1050 | 520 | 310 | 66 A | 3.10 ± .27 | 2.57 ± .05 |
| Kraton ® G7720 | 520 | 580 | 220 | 64 A | 3.89 ± .46 | 2.53 ± .05 |
| TPR ® 9101-75W900 | 755 | 425 | 550 | 79 A | 1.92 ± .17 | 1.63 ± .15 |
| Santoprene ® 101-73 | 980 | 395 | 485 | 75 A | 2.13 ± .08 | 1.94 ± .08 |
| Geolast ® 701-70 | 820 | 250 | 485 | 76 A | 1.02 ± .05 | 0.91 ± .05 |
| Alcryn ® 2070 BK | 1100 | 260 | 740 | 73 A | 1.97 ± .11 | 1.70 ± .08 |
| Hytrel ® 4056 | 4000 | 795 | 8,940 | 43 D | 0.30 ± .04 | 0.24 ± .03 |
| Hytrel ® 5556 | 5650 | 660 | 26,600 | 54 D | 0.25 ± .03 | 0.16 ± .02 |
| Hytrel ® 6359 | 5760 | 560 | 41,900 | 60 D | 0.21 ± .02 | 0.15 ± .01 |
| Hytrel ® 7246 | 6170 | 490 | 69,800 | 69 D | 0.19 ± .02 | 0.12 ± .01 |
| Hytrel ® 8238 | 5480 | 150 | 95,700 | 75 D | 0.12 ± .02 | 0.09 ± .02 |
| Pellethane ® 2102-90A | 7560 | 620 | 8,500 | 93 A | 0.41 ± .05 | 0.29 ± .02 |
| Zytel ® FN714 | 3850 | 150 | 42,000 | 56 D | 0.43 ± .04 | 0.38 ± .04 |
| Grilamid ® L20GT | 6100 | 20 | 180,000 | 66 D | 0.12 ± .02 | 0.07 ± .01 |
| Stanyl ® TW300 | 9400 | 280 | 145,000 | 79 D | 0.15 ± .02 | 0.10 ± .02 |

[1]Determined according to ASTM D1415.
[2]Tensile, Elongation, and Modulus provided by supplier.

3. Fluorination Procedures

The general procedure for the direct fluorination of articles by the methods of this invention has previously been described. Fluorination parameters (i.e., fluorine and nitrogen flow rates, duration of reaction, etc.) that were used to create the specific test articles used to illustrate this invention are listed in Table 4.

All reactions were performed at room temperature in a brass reactor vessel with a internal volume of 0.75 liters. Those skilled in the art will recognize that the parameters presented in Table 4 may be adjusted through routine experimentation to allow the use of alternative reactor designs and capacities. Additionally, these parameters may be routinely adjusted to accommodate the fluorination of suitable alternative elastomer formulations. Typical batch sizes for the preparation of test articles ranges from 1-20 pieces and weighed between 1-80 grams (total batch weight).

Table 4 lists only the fluorination conditions; in all cases, the reactor vessel was purged with nitrogen before and lo after the fluorination process as indicated in Table 1.

TABLE 4

Fluorination Parameters Used to Generate Fluorinated Elastomeric Articles

| TPE | Fluorine Flowrate (SCCM) | Nitrogen Flowrate (SCCM) | Time (mins.) |
|---|---|---|---|
| Kraton ® G7722, G7720 | 20-30 | 30-50 | 60-80 |
| TPR ® 9101-75W900 | 20-30 | 30-50 | 60-80 |
| Santoprene ® 101-73 | 20-30 | 30-50 | 60-80 |
| Geolast ® 701-70 | 20-30 | 30-50 | 60-80 |
| Alcryn ® 2070 BK | 20-30 | 30-50 | 60-80 |
| Hytrel ® 4056, 5556, 6359, 7246, 8238 | 20-30 | 30-50 | 240 (Tensile, Taber Abrasion & Friction Coefficient testing); 480-4800 (Fluid Immersion testing) |
| Zytel ® FN714 | 20-30 | 30-50 | 120 |
| Grilamid ® L20GT | 20-30 | 30-50 | 120 |
| Stanyl ® TW300 | 20-30 | 30-50 | 120 |
| Pellethane ® 2102-90A | 20-30 | 30-50 | 120 |

4. Experimental Results

A. Coefficients of Friction

Static and dynamic coefficients of friction for all test articles were determined according to ASTM D 1894. Results of these tests are presented in Table 5.

TABLE 5

Static and Dynamic Friction Coefficients of Fluorinated TPEs

| TPE | Static Friction Coefficient | Dynamic Friction Coefficient |
|---|---|---|
| Kraton ® G7722 | 0.21 ± .03 | 0.17 ± .02 |
| Kraton ® G7720 | 0.24 ± .03 | 0.17 ± .02 |
| TPR ® 9101-75W900 | 0.17 ± .01 | 0.14 ± .01 |

TABLE 5-continued

Static and Dynamic Friction Coefficients of Fluorinated TPEs

| TPE | Static Friction Coefficient | Dynamic Friction Coefficient |
|---|---|---|
| Santoprene ® 101-73 | 0.14 ± .02 | 0.10 ± .01 |
| Geolast ® 701-70 | 0.21 ± .03 | 0.17 ± .02 |
| Alcryn ® 2070 BK | 0.15 ± .02 | 0.12 ± .01 |
| Hytrel ® 4056 | 0.19 ± .02 | 0.15 ± .01 |
| Hytrel ® 5556 | 0.16 ± .03 | 0.13 ± .01 |
| Hytrel ® 6359 | 0.12 ± .02 | 0.09 ± .01 |
| Hytrel ® 7246 | 0.11 ± .02 | 0.07 ± .01 |
| Hytrel ® 8238 | 0.11 ± .01 | 0.06 ± .01 |
| Zytel ® FN714 | 0.14 ± .02 | 0.13 ± .02 |
| Pellethane ® 2102-90A | 0.33 ± .03 | 0.23 ± .02 |

Static and dynamic friction coefficients for the starting materials are presented in Table 3. Comparison of these values with the results presented in Table 5 indicates that, in most cases, the fluorinated elastomers exhibit significantly reduced friction coefficients relative to their non-fluorinated counterparts.

Fluorinated styrenic, olefinic, TPV and MPR systems all exhibited static and dynamic friction coefficients that were typically between 5-20% of the values of their non-fluorinated counterparts. This represents a drastic reduction in friction in these systems.

For the remaining TPEs studied, the observed friction reductions were less dramatic. For the fluorinated copolyester and polyurethane systems, static and dynamic friction coefficients were typically 60-90% of the values for their non-fluorinated counterparts. However, since the parent systems have low coefficients of friction to begin with, these reductions are still significant.

Of the polyamide TPEs studied, only Zytel FN714 showed a reduction in friction coefficients after exposure to fluorine. The remaining polyamide TPEs studied exhibited an increase in friction coefficients after fluorine exposure.

B. Taber Abrasion

Taber Abrasion data was determined according to ASTM D3389 using either the "weight loss" or "wear factor" methods discussed in the "Analytical Techniques" Section. These results were summarized on Tables 6 and 7, respectively.

Santoprene ®101-73 and Geolast ®701-70, which closely resemble conventional rubber in their performance properties, were amenable to the "wear factor" method of analysis. Other materials studied more closely resembled conventional thermoplastics and therefore were evaluated by the "weight loss" method. Fluorinated Santoprene 101-73 showed a performance advantage over the non-fluorinated material by both Taber Abrasion methods.

TABLE 6

Taber Abrasion Data for Fluorinated and Non-Fluorinated TPEs Using the Weight Loss Method

| | Weight Loss (mg)[1] | |
|---|---|---|
| TPE | Fluorinated | Non-Fluorinated |
| Santoprene ® 101-73[2] | 65 | 75 |
| Hytrel ® 4056[3] | 114 | 117 |
| Hytrel ® 5556[3] | 92 | 107 |
| Hytrel ® 6359[3] | 73 | 102 |
| Hytrel ® 7246[3] | 71 | 99 |
| Hytrel ® 8238[3] | 71 | 89 |
| Pellethane ® 2102-90A[3] | 30 | 36 |

[1]Mean of 3 separate runs.
[2]H-18 wheels, 1000 g. load, 300 cycles.
[3]H-18 wheels, 1000 g. load, 1000 cycles.

TABLE 7

Taber Abrasion Data for Fluorinated and Non-Fluorinated TPEs Using the "Wear Factor" Method

| | Cycles to Wear-through[1,2] | | Wear |
|---|---|---|---|
| TPE | Fluorinated | Non-Fluorinated | Factor |
| Santoprene ® 101-73[2] | 46 | 18 | 0.39 |
| Geolast ® 701-70 | 76 | 50 | 0.66 |

[1]H-18 wheels, 1000 g. load.
[2]Mean of 3 separate runs.

In all cases, the fluorinated elastomer exhibited superior Taber Abrasions characteristics.

C. Tensile Testing

All tensile testing was performed in accordance with ASTM D412 or with ASTM D1708 using an Instron Model 4204 Tensile Tester. Test results are presented in Table 8.

TABLE 8

Tensile Properties of Fluorinated TPEs

| TPE | Tensile Strength (psi) | Elongation (%) | 100% Modulus (psi) | Hardness (Shore) |
|---|---|---|---|---|
| Kraton ® G7722[1] | 1030 | 520 | 315 | 66-67 A |
| Kraton ® G7720 | 620 | 665 | 215 | 65 A |
| TPR ® 9101-75W900[1] | 750 | 450 | 540 | 79 A |
| Santoprene ® 101-73[1] | 990 | 400 | 485 | 76 A |
| Geolast ® 701-70[1] | 775 | 225 | 500 | 77 A |
| Alcryn ® 2070 BK[1] | 1070 | 240 | 740 | 73 A |
| Hytrel ® 4056[2] | 4350 | 810 | 8,240 | 43 D |
| Hytrel ® 5556[2] | 5100 | 600 | 23,100 | 54 D |
| Hytrel ® 6359[2] | 5290 | 510 | 41,800 | 61 D |
| Hytrel ® 7246[2] | 5700 | 420 | 72,600 | 70 D |
| Hytrel ® 8238[2] | 5620 | 275 | 131,000 | 75 D |
| Pellethane ® 2101-90A[2] | 7700 | 615 | 7,750 | 93 A |
| Zytel ® FN714[2] | 2500 | 170 | 50,000 | 57 D |

[1]ASTM D412
[2]ASTM D1708

Tensile strengths and elongations of fluorinated TPEs were generally found to be within ±10% of the values of the corresponding non-fluorinated TPE (see Table 3 for original physical properties of starting materials).

100% Modulus and hardness values remained essentially constant for all systems studied, before and after exposure to fluorine.

Stress/strain curves were plotted for all systems before and after exposure to fluorine. In all elastomers studied, no significant differences were found between the stress/strain behavior of fluorinated and non-fluorinated systems. This indicates that, essentially, the mechanical behavior of fluorinated elastomers prepared by the methods of this invention are the same as those of the non-fluorinated precursor.

Figure 1:
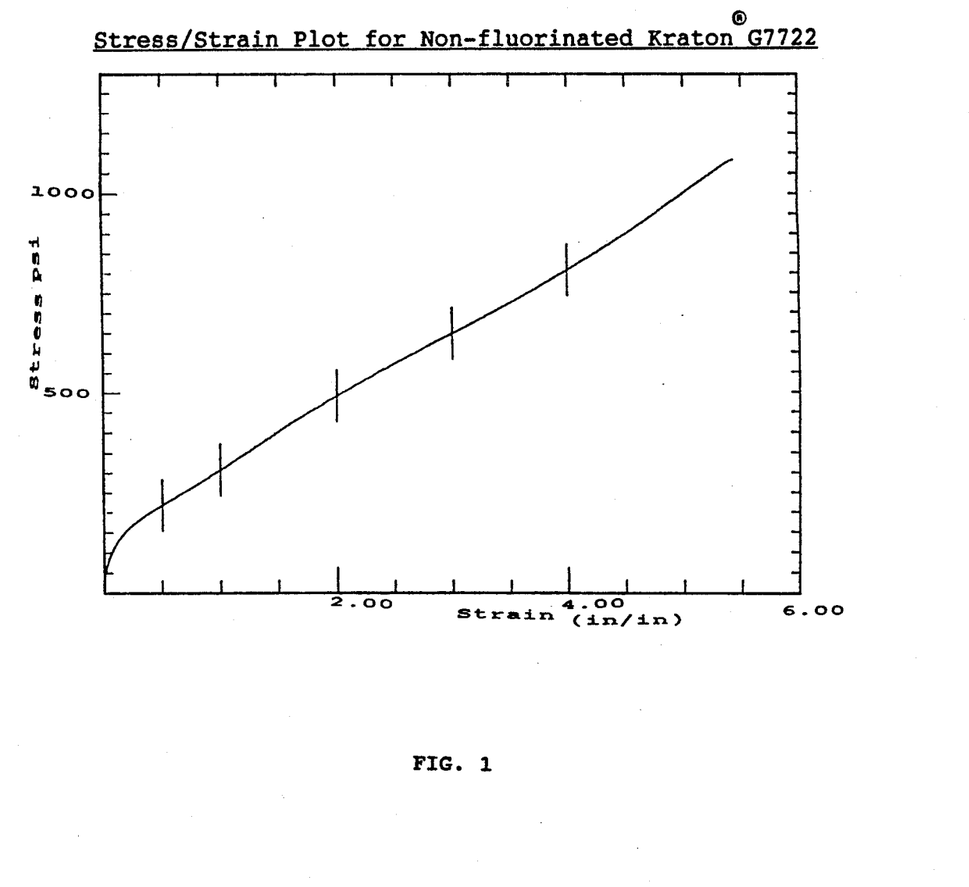
FIGS. 1–4 show stress/strain plots of two representative TPEs before and after exposure to fluorine.
Figure 2:
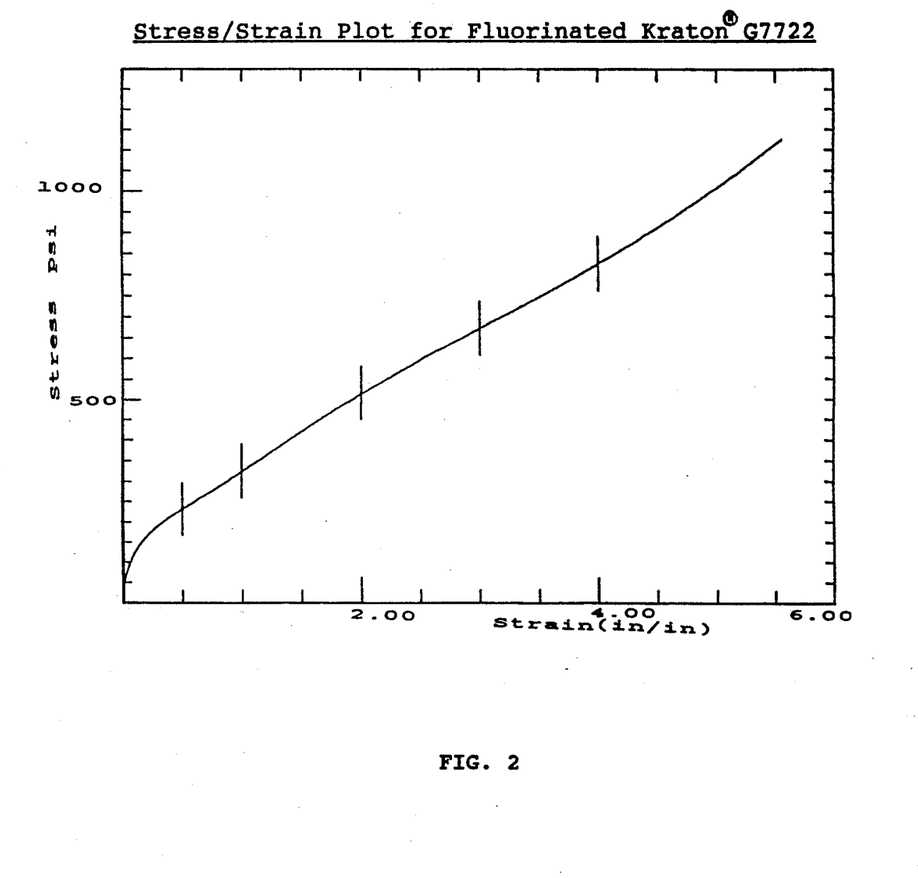
Figure 3:
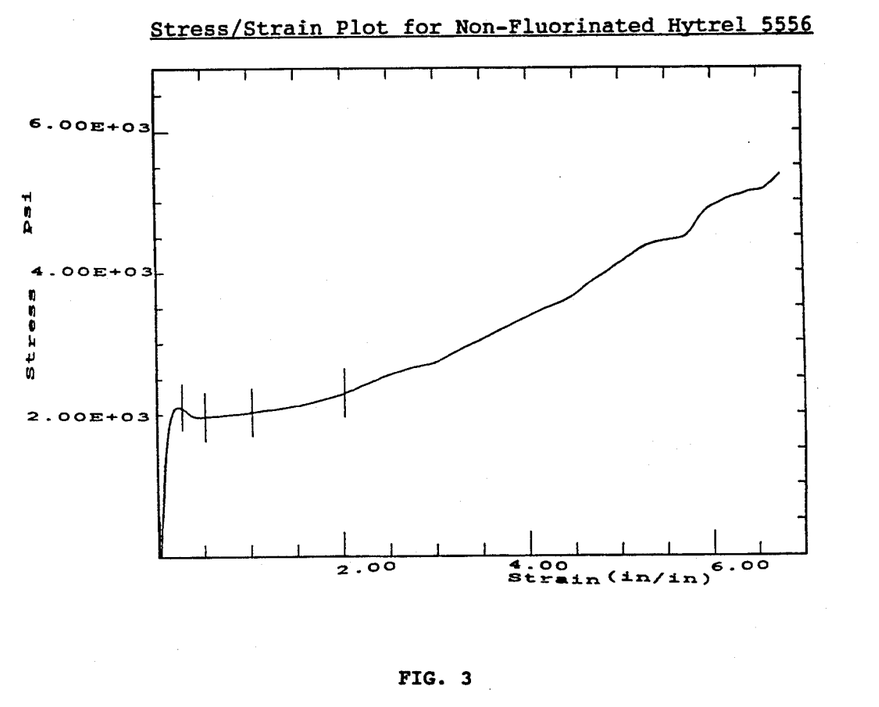
Figure 4:
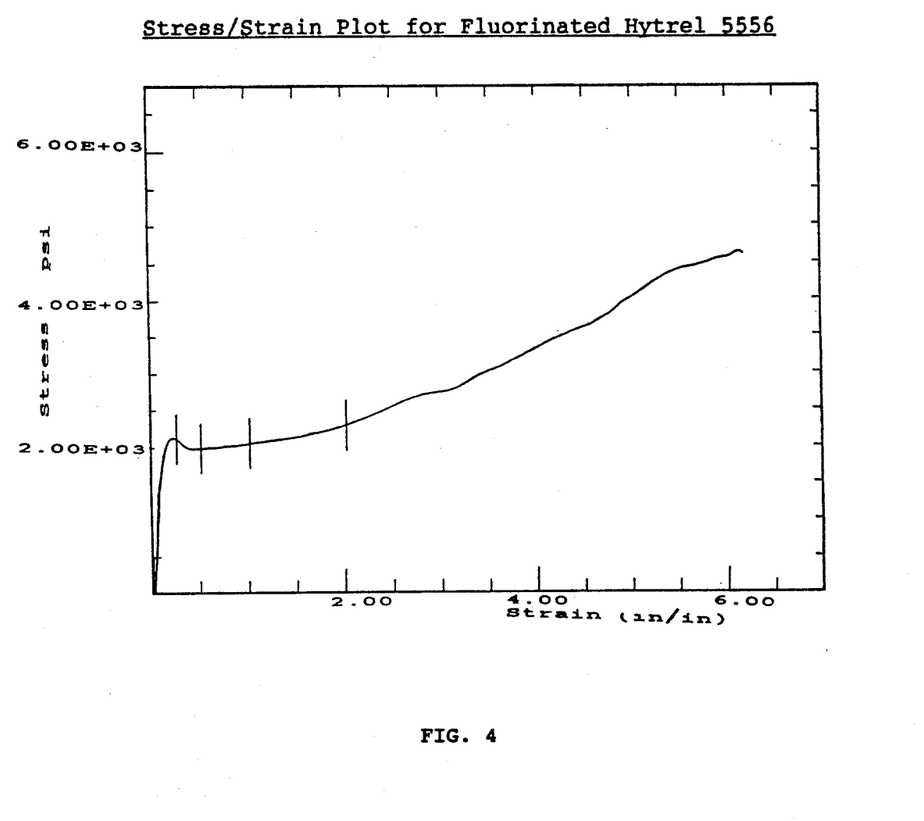

The stress/strain plots of two representative TPEs (Kraton ®G7722 and Hytrel ®5556), before and after exposure to fluorine, are presented in FIGS. 1 through 4, respectively.

D. Infrared Analysis

Infrared analyses of all elastomers before and after exposure to fluorine were made with a Nicolet Model 5PC FTIR Spectrometer, using the ATR technique described previously.

The infrared spectra of all TPEs after exposure to fluorine by the methods of this invention were characterized by a broad, relatively intense absorption centered around 1,100 wavenumbers. This absorption frequency is characteristic of the carbonfluorine bond; its presence indicates the fluorination of the base polymer in each TPE. With the exception of this absorption, most IR spectra of fluorinated elastomers were relatively featureless.

The appearance of an absorption frequency at 1,100 wavenumbers occurred with the concomitant loss of a strong absorption frequency at around 3,000 wavenumbers, observed in the IR spectra of all elastomers studied, prior to fluorine exposure. It is well documented that carbon-hydrogen bonds absorb IR radiation at around 3,000 wavenumbers. Consequently, this indicates that exposure of hydrocarbon-based elastomers to fluorine results in the replacement of hydrogen atoms o the polymer backbone by fluorine atoms.

Figure 5:
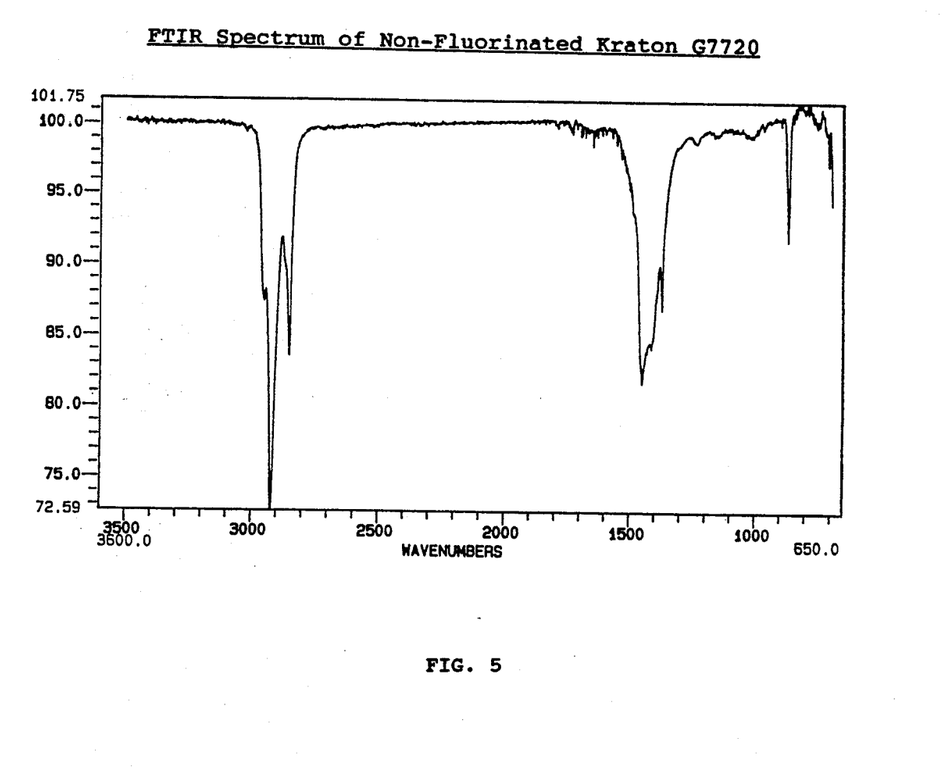
FIGS. 5–8 show FTIR spectra of two representative TPEs before and after exposure to fluorine.
Figure 6:
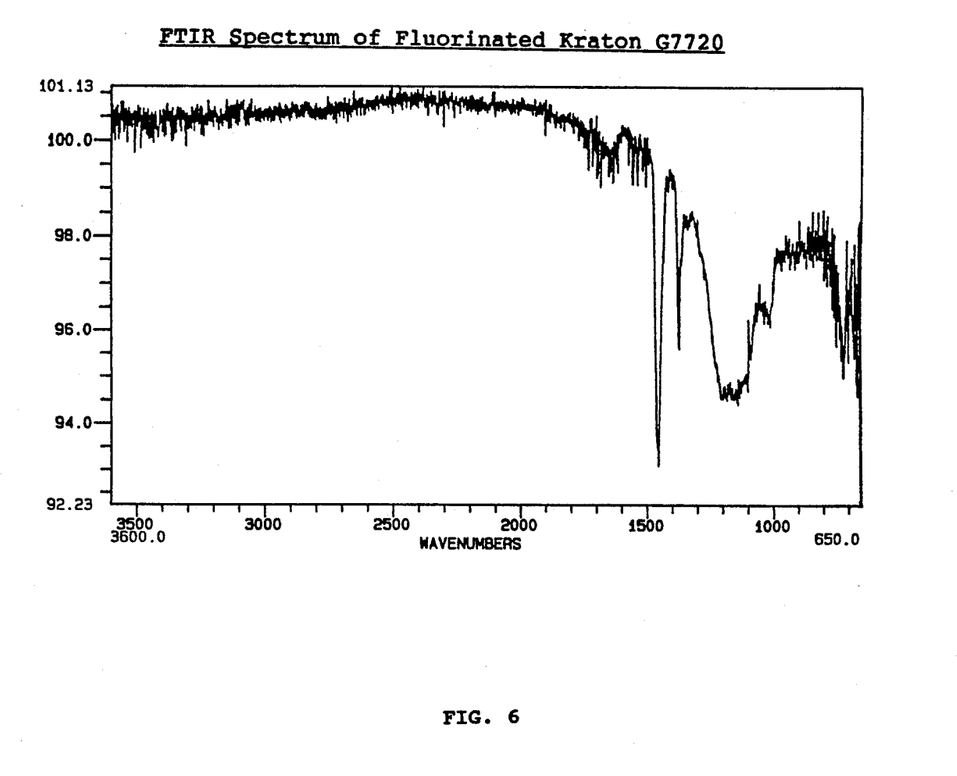
Figure 7:
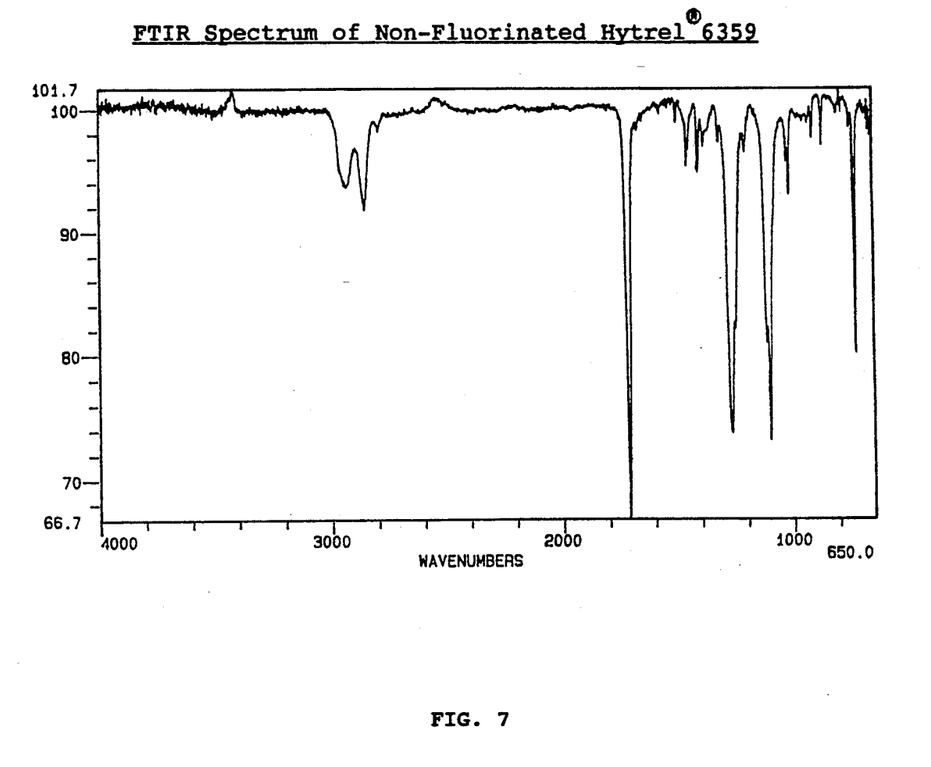
Figure 8:
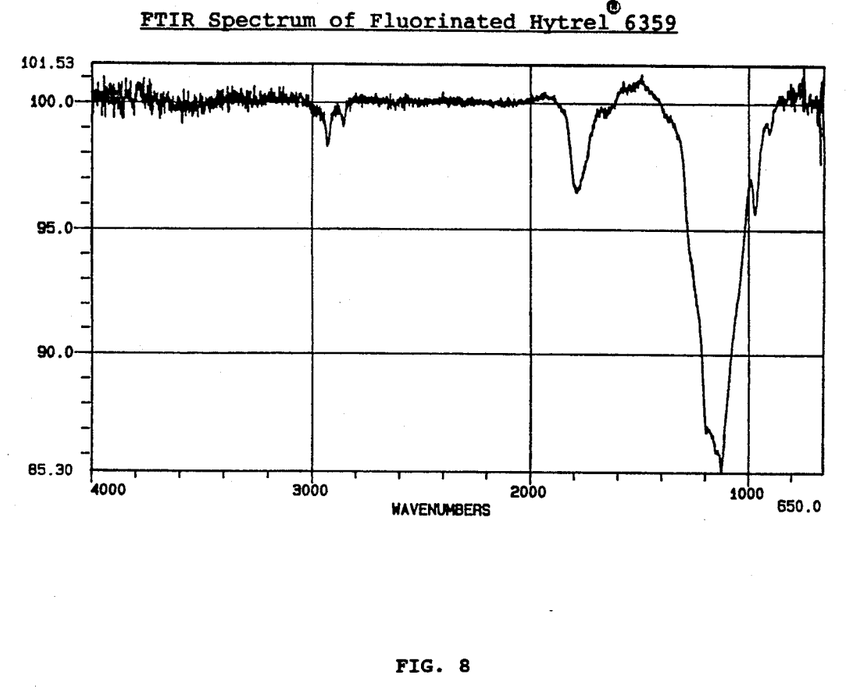

The FTIR spectra of two representative TPE systems (Kraton ®G7720 and Hytrel ®6359) taken prior to and after exposure to fluorine are presented in FIGS. 5 through 8.

E. Fluid Permeability Resistance

The ability of certain thermoplastic elastomers to withstand swelling when immersed in polar solvents, such as phosphate ester-based test fluids was evaluated according to ASTM D471. In all cases, the specimens were ASTM "Microtensile" dumbbells of material. All immersion tests were performed at 100° C. and were of 22 hours duration. Copolyester-type TPEs were found to exhibit a significantly increased resistance to swell after exposure to fluorine. Additionally, it was found that there was a marked correlation between resistance to swell and time of exposure to fluorine, i.e. permeability resistance in these systems increased with exposure to fluorine. These results are summarized in Table 9.

TABLE 9

Volume Swell vs. Exposure Time to Fluorine for Copolyester TPEs
(Skydrol, 500 B-4, 100° C., 22 hours immersion)

| TPE | % Swell | | | |
|---|---|---|---|---|
| | 0 | 8 | 16 | 80[1] |
| Hytrel ® 4056 | 170 | 147 | 125 | 110 |
| Hytrel ® 5556 | 26 | 21 | 18 | 2 |
| Hytrel ® 6359 | 18 | 11 | 6 | 1 |
| Hytrel ® 7246 | 7 | 2 | 0 | −1 |
| Hytrel ® 8238 | 3 | 0 | 0 | −1 |

[1]Exposure time to fluorine in hours (flowrates as in Table 4).

Other TPEs studied exhibited less dramatic permeability resistances after exposure to fluorine by the methods of this invention. The results of these experiments are presented in Table 10.

TABLE 10

Volume Swell vs. Exposure Time to Fluorine for TPR,
9101-75W900 and Alcryn, 2070 BK
(Skydrol, 500 B-4, 100° C. 22 Hrs.

TABLE 10-continued

| TPE | % Swell | | |
|---|---|---|---|
| | 0 | 16 | 80 |
| TPR, 9101-75W900 | −12 | −11 | 0 |
| Alcryn, 2070 BK | 195 | 190 | 1 |

[1]Exposure to time to fluorine in hours (flowrates as in Table 4).

TPR 9101-75W900 exhibited a zero volume swell in Skydrol 500B-4 after prolonged exposure to fluorine. This indicates that the barrier properties of this material are improved in two ways, i.e., fluids are prevented both from entering and leaving the body of the article after exposure to fluorine.

While this invention has been described as having a preferred design, the present invention can be further modified within the spirit and scope of this disclosure. This application is therefore intended to cover any variations, uses, equivalents or adaptations of the invention using its general principles. Further, this application is intended to cover such departures from the present disclosure as come within known or customary practice in the art to which this invention pertains and which fall within the limits of the appended claims.

What is claimed is:

1. A method of producing fluorinated elastomeric articles, comprising the steps of:
providing a thermoplastic elastomeric article amenable to treatment with fluorine; and
exposing said article to gaseous fluorine under conditions sufficient to reduce the friction coefficient of said article without promoting degradation of the tensile properties of said article.

2. The method of claim 1, in which the thermoplastic elastomeric article comprises an elastomeric polymer having a backbone chain substantially comprised of carbon atoms, said carbon atoms having a high proportion of hydrogen atoms attached thereto by replaceable aliphatic carbon-hydrogen bonds, and wherein a sufficient number of said hydrogen atoms are replaced by fluorine atoms when said article is exposed to fluorine gas so that said fluorinated thermoplastic elastomeric article has said reduced friction coefficient.

3. The method of claim 2, wherein a fluorinated material is generated on the external portion of said thermoplastic elastomeric article during said fluorination and extends inwardly into the matrix of said article a distance sufficient to reduce said friction coefficient.

4. The method of claim 1, wherein the thermoplastic elastomeric article is exposed to gaseous fluorine in a reactor vessel in the presence of a hydrogen fluoride scavenger.

5. The method of claim 4, including the step of flushing the reactor vessel with an inert gas prior to exposing said article to fluorine gas, and wherein said fluorine gas is exposed to said article as a gaseous mixture of fluorine gas and said inert gas.

6. The method of claim 5, wherein the concentration of fluorine in said gaseous mixture is between about 2% and about 95%.

7. The method of claim 5, wherein the concentration of fluorine in said gaseous mixture is between about 5% and about 75%.

8. The method of claim 5, wherein the concentration of fluorine gas in said gaseous mixture is at least 0.5%.

9. The method of claim 1, in which said elastomeric article comprises a thermoplastic polymer having a backbone chain substantially composed of carbon atoms, said backbone chain having a high proportion of hydrogen atoms attached thereto by replaceable aliphatic carbon-hydrogen bonds, wherein a sufficient number of said hydrogen atoms of said backbone chain are replaced by fluorine atoms when said article is exposed to gaseous fluorine so that said friction coefficient of said fluorinated article is reduced without promoting said degradation of the tensile properties of said article, said fluorination generating a fluorinated material on the external portion of said article, which fluorinated material extends inwardly into the matrix of said elastomeric elastomer.

10. The method of claim 1, wherein said thermoplastic article comprises a formulation including a base polymer and a filler.

11. The method of claim 10, in which said filler is selected from the group consisting of carbon black, graphite, carbon powders and fibers, fluorocarbons and molybdenum disulfide, wherein said base polymer and filler comprise at least 95% by weight of said formulation.

12. The method of claim 4, wherein said hydrogen fluoride scavenger comprises sodium fluoride or potassium fluoride.

13. The method of claim 4, in which hydrogen fluoride is released when said elastomeric article is exposed to fluorine, and wherein said hydrogen fluoride scavenger is present in an amount sufficient to react with substantially all of said released hydrogen fluoride.

14. The method of claim 1, wherein said elastomeric article comprises at least one member selected from the group consisting of copolyester thermoplastic elastomers, olefinic thermoplastic elastomers/thermoplastic polyolefins, styrenic thermoplastic elastomers, elastomeric alloy thermoplastic elastomers, polyurethane thermoplastic elastomers, and polyamide thermoplastic elastomers.

15. A method for producing a fluorinated elastomeric article, comprising the steps of:
providing a thermoplastic elastomeric article, said thermoplastic elastomeric article comprising an elastomeric polymer having a backbone chain, said backbone chain including a sufficient number of replaceable aliphatic carbon-hydrogen bonds so that a generally fluorinated matrix is generated upon exposing said article to fluorine;
placing said thermoplastic elastomeric article in a reactor vessel;
establishing a flow of an inert gas into the reactor vessel to provide an inert atmosphere and to purge said vessel of oxygen and moisture; and
fluorinating said elastomeric article by introducing a flow of fluorine gas into said reactor, said fluorination being of sufficient duration and said flow of fluorine gas including a sufficient amount of fluorine so that the fluorinated elastomeric article generated thereby has a reduced coefficient of friction and the tensile properties of said fluorinated elastomeric article are substantially maintained when compared with said thermoplastic elastomeric article.

16. The method of claim 15, wherein said step of fluorinating said elastomeric article includes introducing said flow of fluorine gas as a gaseous mixture of fluorine and said inert gas.

17. A method of reducing the friction coefficient and improving the wear life of elastomeric articles, comprising:
placing a thermoplastic elastomeric article in a reactor vessel, said thermoplastic elastomeric article being amenable to fluorine modification and having a backbone chain substantially comprised of carbon atoms, said carbon atoms having a plurality of replaceable hydrogen atoms attached thereby by aliphatic carbon-hydrogen bonds;
establishing a flow of an inert gas into the reactor vessel to provide an inert atmosphere and to purge said vessel of oxygen and moisture; and
fluorinating said article by introducing a flow of fluorine gas into said reactor vessel, said fluorine gas being introduced into said vessel under conditions sufficient to generate a fluorinated matrix on the external surface of said article, which fluorinated matrix extends inwardly into the interior of the article to a depth sufficient to reduce said friction coefficient and to improve said wear life, said article being fluorinated under conditions which minimize scission of the backbone chain.

18. The method of claim 17, wherein said thermoplastic elastomeric article is placed in the reactor vessel in the presence of a hydrogen fluoride scavenger.

19. The method of claim 18, wherein said hydrogen fluoride scavenger comprises at least one of sodium fluoride and potassium fluoride.

20. The method of claim 17, wherein said fluorine gas is introduced into the reactor vessel as a gaseous mixture of fluorine gas and an inert gas.

21. A method of improving the performance characteristics of thermoplastic elastomeric articles, wherein said performance characteristics include a reduced friction coefficient, an increased wear life, and an increased resistance to fluid permeability, said method comprising:
placing a thermoplastic elastomeric article in a reactor vessel, said thermoplastic elastomeric article being amenable to fluorine modification and having a backbone chain substantially comprised of carbon atoms, said carbon atoms having a plurality of replaceable hydrogen atoms attached thereto by aliphatic carbon-hydrogen bonds;
establishing a flow of an inert gas into the reactor vessel to provide an inert atmosphere and to purge said vessel of oxygen and moisture; and
fluorinating said article by introducing a flow of fluorine gas into said reactor vessel, said fluorine gas being introduced into said vessel under conditions sufficient to generate a fluorinated matrix on the external surface of said article, which fluorinated matrix extends inwardly into the interior of the article to a depth sufficient to improve said performance characteristics, said article being fluorinated under conditions which minimize scission of the backbone chain.

22. The method of claim 21, wherein said thermoplastic elastomeric article is placed in the reactor vessel in the presence of a hydrogen fluoride scavenger.

23. The method of claim 22, wherein said hydrogen fluoride scavenger comprises at least one of sodium fluoride and potassium fluoride.

24. The method of claim 21, wherein said fluorine gas is introduced into the reactor vessel as a gaseous mixture of fluorine gas and an inert gas.

25. The method of claim 21, wherein said elastomeric article is a copolyester thermoplastic elastomer.

26. The method of claim 25, wherein the resistance to fluid permeability of said copolyester thermoplastic elastomer increases in correlation with the exposure of said elastomer to fluorine.

* * * * *